United States Patent [19]
Garfinkle

[11] Patent Number: 5,404,243
[45] Date of Patent: Apr. 4, 1995

[54] BEAM-DISPERSING DEVICE

[76] Inventor: Marvin Garfinkle, P.O. Box 15855, Philadelphia, Pa. 19103

[21] Appl. No.: 375,365

[22] Filed: Apr. 13, 1989

[51] Int. Cl.⁶ .............................................. G02F 1/01
[52] U.S. Cl. .................................................. 359/241
[58] Field of Search ................. 350/354, 168; 359/241

[56] References Cited
U.S. PATENT DOCUMENTS
4,900,135 2/1990 Yuasa et al. .......................... 350/354

Primary Examiner—Mark Hellner

[57] ABSTRACT

A beam dispersing device is disclosed whereby a matrix of reagent containing capsules are ruptured by an impinging laser beam, thus releasing the reagents to form a beam dispersing particulate.

4 Claims, 2 Drawing Sheets

BEAM-DISPERSING DEVICE

BACKGROUND OF THE INVENTION

In terms of the energy delivered to the target in comparison to chemical explosives, beam weapons that emit coherent electromagnetic radiation, termed laser weapons, are inconsequential. However, in terms of energy-density, the energy delivered by a laser beam is magnitudes more intense than chemical explosives. Moreover, delivery time is essentially instantaneous, measured in microseconds over terrestrial distances. It is only for these two reasons: high energy-density and high delivery rate, that such low-energy devices are even seriously considered for military purposes.

The effectiveness or chemical explosives, requiring physical delivery systems, can be thwarted by passive means, such as armor plate, or active means, such as anti-missile systems. In contrast, beam weapons are highly environment sensitive. For example, particulate matter, such as dust or water droplets in ground fog or clouds, effectively disperse the beam energy. Nevertheless, If a reasonable fraction or the emitted energy can be delivered, these weapons under the proper conditions can be devastating against vehicles or personnel and equally so against aircraft and ballistic nosecones.

OBJECTIVE OF THE INVENTION

Most battlefield weapons, whether ground based or airborne, still depend on line-of-sight ranging, the conditions under which beams weapon are effective. Under such conditions there exists a paucity of target defense means. Likewise, aircraft and ballistic nosecones have no effective protection against such weapons. The objective of this invention is to ameliorate the effect of beam strikes.

The penetration of a target plate comprised of ordinary material by a laser beam requires that the energy density be sufficient to vaporize the material at the point of contact, as illustrated in FIG. 1. Moreover, the duration of the beam pulse must be sufficient for beam penetration of the full thickness T of the plate, generally in a fraction of a millisecond. In general the vapor produced does not absorb or disperse the beam. The vaporization front moves inwards from the outer surface of the skin. Full penetration of the plate exposes the target itself to the beam.

Accordingly, not only must the beam have sufficient energy, but the pulse must have sufficient duration for complete penetration. Interruption of the beam will allow very rapid cooling of the vaporization front, again in a fraction of a millisecond. The vaporization front is decidedly not self-propagating.

The minimum pulse duration is simply $T/\mu$ because the vaporization front cannot move at a speed greater than the skin's acoustical wave speed $\mu$. The actual speed of the vaporization front will depend inversely on the heat of vaporization, heat conductivity and heat capacity of the skin material, and can be significantly slower than $\mu$, requiring a longer pulse duration. Moreover, because the coherent beam is not perfectly collimated, some divergence occurs, further slowing the actual penetration speed of the vaporization front. Partial beam dispersion by airborne articulate matter has a similar effect.

Evidently, laser beams are readily dispersed by clouds of particulate matter. In accordance with the invention, if the target plate, whether the armor of a vehicle or the skin of an airplane a ballistic nosecone, generates a particulate cloud of sufficient density and duration as a result of laser beam penetration then the beam will be dispersed and the vaporization front lost.

FIG. 2 illustrates a composite construction comprising an outer skin, a capsule-dispersed matrix core, and the target plate. The outer skin can be either reflecting In the laser wavelength range to minimize the effect of a beam strike or absorbing in the microwave range to minimize radar detection.

The randomly suspended capsules within the matrix core between the double skins can be constructed of either metallic, ceramic or polymeric material. The individual capsules dispersed in the matrix each contain one of two reagents that upon rupture of the capsules will combine to form fine particulate matter capable of efficiently dispersing a laser beam.

Because of the low density of the matrix and capsules, the core mass will have minimal effect on target weight, for which compensation can be readily made. Consequently, the core might be perhaps a decimeter or more in thickness.

For example, the encapsulated reagents might be titanium tetrachloride ($TiCl_4$) and water ($H_2O$) in the proportion of 75 volume percent $TiCl_4$ to 25 volume percent $H_2O$. This would result in a roughly stoichiometric proportion of reactants and would require a 3/1 ratio of essentially equal volume $TiCl_4$ and $H_2O$ capsules. Both the $TiCl_4$ and $H_2O$ are normally liquids that must be protected from temperature extremes, probably by an insulating layer beneath the reflective skin.

Upon penetration of the outer skin by a laser beam the moving vaporization front will enter the composite core and intercept the capsules. Rupturing the capsules will release the reagents, resulting in vaporization of both reagents. The released $TiCl_4$ and $H_2O$ vapors upon contact will combine to form refractory titanium dioxide ($TiO_2$) particles in accordance with the overall reaction:

$$TiCl_2 + 2H_2O \rightarrow TiO_2 + 4HCl.$$

Reaction is very rapid, with titanium dioxide particles formed in a fraction of a millisecond. Titanium dioxide has a high refractive index, which recommends it as a paint pigment and it is the standard commercial and military smoke-screen particulate. The hydrogen chloride (HCl) gas formed will expel the $TiO_2$ into the path of the beam, partially dispersing the beam laterally and disrupting the vaporization front. As illustrated in FIG. 2, the effect or this lateral dispersion will be the rupturing of additional capsules, further dispersing the beam. Any remnants or the beam that reaches the target plate will be so dispersed that significant penetration will be improbable. A second beam strike, unless coincidental with the first, will be equally dispersed.

PREFERRED EMBODIMENT OF THE INVENTION

Figure 1:
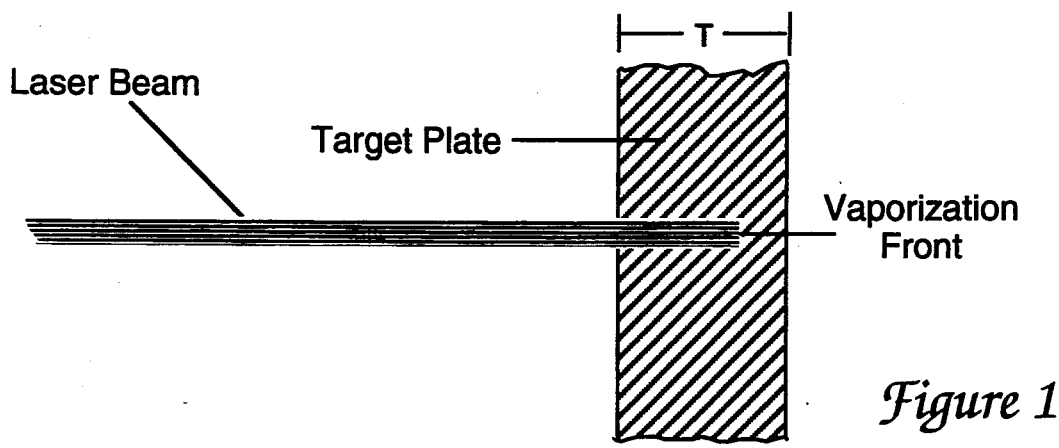
FIG. 1 illustrates the effect of a beam strike on an ordinary target plate.
Figure 2:
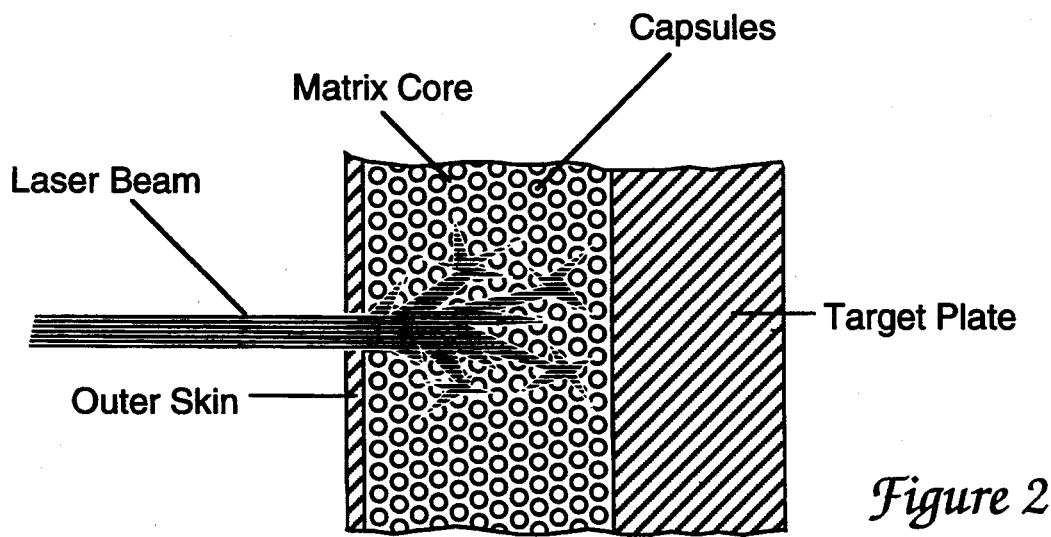
FIG. 2 illustrates the effect of a beam strike on a capsule-dispersed matrix core.
Figure 3:
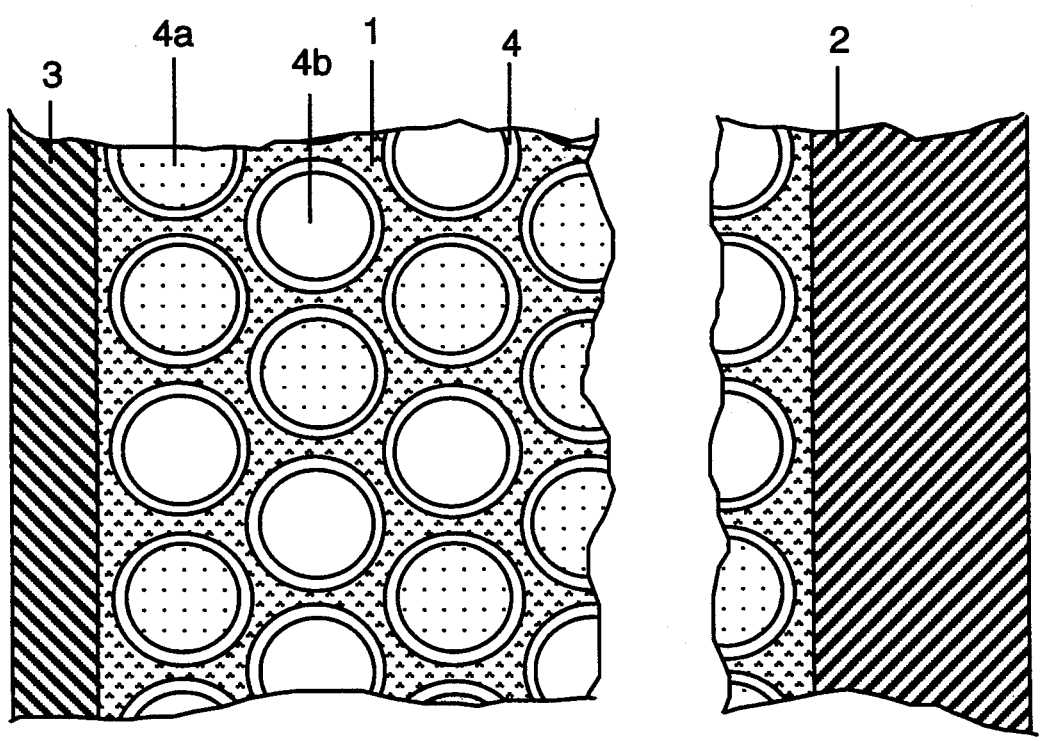
FIG. 3 illustrates an capsule-dispersed matrix core in detail.

FIG. 3 schematically illustrates a cross-section of a composite beam-dispersing device comprising matrix core 1 protecting target plate 2 and covered by outer skin 3. Dispersed in matrix core 1 are capsules 4 constructed of either metallic, ceramic or polymeric material. Capsules 4a and 4b each contains either one of two reagents. Capsule 4a contains one of these reagents and capsule 4b contains the other. Upon rupturing of capsules 4 randomly dispersed In matrix core 1 the released reagents combine to form particulate matter. Such particulate matter is effective in dispersing a laser beam pulse that penetrates into matrix core 1 and ruptures capsules 4a and 4b.

The beam-dispersing device disclosed herein would be useful on the battlefield in protecting personnel carriers and ground-support aircraft from laser beam strikes. Moreover, because of the light weight of the beam-dispersing device, with e flexible matrix core individual protection from beam strikes can be provided.

While there have been described what is at present considered to be the preferred embodiment of a Beam-Dispersing Device, it will be obvious to those skilled in the art that various changes and modifications may be made therein without departing from the invention, and it is aimed therefore in the appended claims to cover all such changes and modifications as fall within the true spirit and scope of the invention.

What is claimed as the invention is:

1. A beam dispersing device comprising an outer skin and a target plate between which is disposed a matrix core, dispersed within said matrix core capsules containing reagents, the combination of said reagents released upon rupture of said capsules forming particulate matter, said particulate matter effective in dispersing a laser beam;

whereby penetration of said outer skin by said laser beam exposes said capsules to said laser beam, causing rupture of said capsules and release of said reagents, the combination of said released reagents forming said particulate matter, said particulate matter dispersing said laser beam, thereby preventing penetration of said target plate by said laser beam.

2. A matrix core according to claim 1 comprising essentially a polymeric resin.

3. A matrix core according to claim 1 wherein said capsules each contain one of two said reagents that upon contact said two reagents combine to form particulate matter.

4. A matrix core according to claim 1 wherein said reagents comprise essentially titanium tetrachloride and essentially water and said particulate matter comprises essentially titanium dioxide.

* * * * *